United States Patent [19]

Shimano

[11] Patent Number: 4,569,249

[45] Date of Patent: Feb. 11, 1986

[54] PEDAL FOR A BICYCLE

[75] Inventor: Keizo Shimano, Sakai, Japan

[73] Assignee: Shimano Industrial Company Limited, Osaka, Japan

[21] Appl. No.: 617,839

[22] Filed: Jun. 6, 1984

Related U.S. Application Data

[63] Continuation of Ser. No. 333,253, Dec. 21, 1981, abandoned.

[30] Foreign Application Priority Data

Dec. 28, 1980 [JP] Japan .............................. 55-188818[U]
Oct. 30, 1981 [JP] Japan .............................. 56-163161[U]

[51] Int. Cl.$^4$ .............................................. G05G 1/14
[52] U.S. Cl. .................................... 74/594.4; 74/594.6
[58] Field of Search .............................. 74/594.4, 594.6

[56] References Cited

U.S. PATENT DOCUMENTS 2,178,921 11/1939 Schwinn .............................. 74/594.4
2,542,548 2/1951 Matthias et al. .................... 74/594.4

FOREIGN PATENT DOCUMENTS 511650 6/1952 Belgium .............................. 74/594.4
2143090 2/1973 France .
2436707 4/1980 France .
2440867 6/1980 France .
2440866 6/1980 France .
55-71989 5/1980 Japan .
256750 3/1949 Switzerland .
290481 8/1953 Switzerland .
279819 1/1954 Switzerland .

Primary Examiner—James A. Leppink
Assistant Examiner—Frank H. McKenzie, Jr.
Attorney, Agent, or Firm—Stevens, Davis, Miller & Mosher

[57] ABSTRACT

A pedal for a bicycle, which is provided at the upper surface of a pedal body having a pedal shaft and in the vicinity thereof with a first foot bearing portion with which the head portion of a first metatarsus at a cyclist's foot comes into contact and a second foot bearing portion with which at least a fifth metatarsus among the second and fifth metatarsi at the same comes into contact.

4 Claims, 4 Drawing Figures

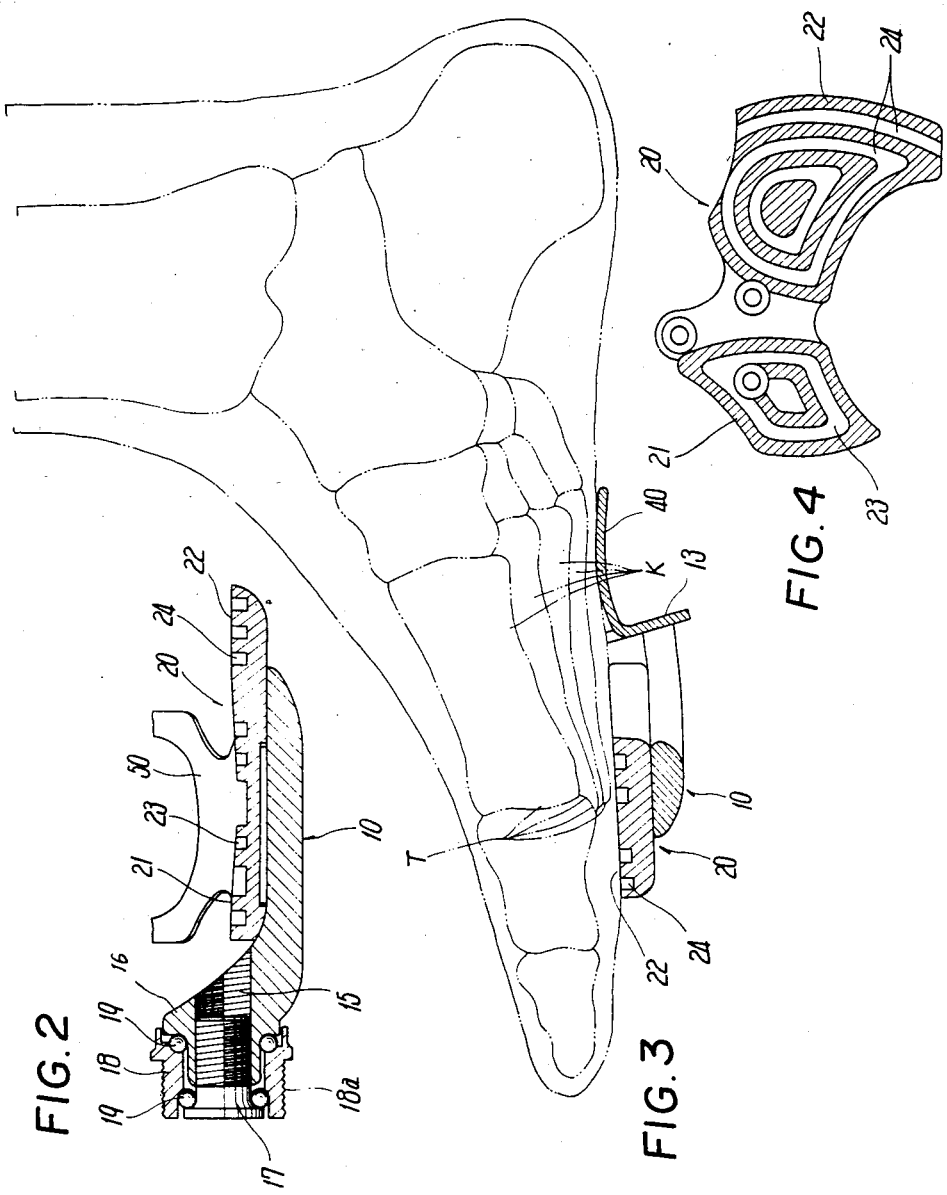

PEDAL FOR A BICYCLE

This application is a continuation of application Ser. No. 333,253, filed Dec. 21, 1981, now abandoned.

FIELD OF THE INVENTION

This invention relates to a pedal for a bicycle, and more particularly to a pedal for a bicycle, which comprises a pedal body having a pedal shaft and is supported rotatably to the upmost end of a crank arm, so that a cyclist treads the pedal body by his foot for cranking.

BACKGROUND OF THE INVENTION

Generally, a pedal body at a pedal for the bicycle, as disclosed in the U.S. Pat. No. 2,542,548 and Swiss Pat. No. 279,819, has foot bearing portions provided at both sides of a pedal shaft and in parallel thereto.

The foot bearing portions are disposed linearly in parallel to the pedal shaft while a cyclist places on the pedal body his foot at the first through fifth metatarsi arranged at the heads thereof in an arcuate shape, so that the head of the fifth metatarsus, even when that of the first metatarsus is placed on the foot bearing portion, will come off therefrom.

A bony framework of the human foot comprises 26 bones in combination, which are roughly divided from an aspect of construction into the tarsi, metatarsi, and phalanges. The tarsi are composed of seven bones of the calcaneous, talus, cuboid, navicular, and first through third cuneiforms in a tight combination, the metatarsi comprising five bones corresponding in number to the toes and extending frontward from the group of tarsal bones and disposed laterally of the foot, the phalanges extending frontward from the metatarsi and comprising 14 bones of the first phalange for the big toe comprising two bones and the second to fifth phalanges for other toes comprising three bones respectively.

From the aspect of the bony framework and function, the calcaneous, cuboid, first to third cuneiforms, first and third metatarsi, and first to third phalanges, are included in a first group, and the talus, navicular, fourth and fifth metatarsi, and fourth and fifth phalanges, are included into a second group.

The bones in the first group bear a body weight and function to kick the ground when a person steps forward and those in the second group function to balance his body for a smooth walk.

In view of the above, the conventional pedal creates a problem in that the head of the fifth phalange comes off from the foot bearing portion even when that of the first phalange contacts therewith, so that the cyclist cannot transmit his treading force effectively to the pedal body, and his pedalling operation is unbalanced and unsmooth. As a result, it is difficult for him to get a larger treading force by effective use of energy because his foot is readily fatigued.

SUMMARY OF THE INVENTION

An object of the invention is to provide a pedal for a bicycle, which allows the cyclist to inevitably bring at least the head of the fifth phalange into contact with the foot bearing portion at the pedal when he places the head of the first phalange onto the same portion, so that he can transmit a large treading force effectively to the pedal, thereby performing a well balanced, smooth, and fatigueless pedalling operation.

The pedal of the invention is provided at the upper surface of a pedal body having a pedal shaft and in the vicinity thereof with a first foot bearing portion to contact with the head of the first phalange at the cyclist's foot and a second foot bearing portion to contact with at least the fifth phalange among the second to fifth phalanges at the same, so that when placing the head of first phalange on the first foot bearing portion, the cyclist can surely bring the head of the fifth phalange into contact with the second foot bearing portion. Hence, bones in the aforesaid first group and those in the second group function to allow him to perform an effective pedalling operation.

Therefore, the treading force is transmitted effectively to the pedal body through the head of the first phalange and the treading-on and kick-up of the pedal are ensured by a spring function of the same. Also, the head of the fifth phalange in contact with the second foot bearing portion allows the cyclist to perform a well-balanced, smooth, and fatigueless pedalling operation, thereby obtaining a large treading force.

Also, the pedal body of the invention provides the minimal foot bearing portion necessary for pedalling, which is simple in shape, lightweight, and inexpensive to produce.

The first and second foot bearing portions may be integral with the pedal body, or provided at a member separate from the pedal body. Such member facilitates the provision of an antiskid means at each foot bearing portion and the manufacture of a pedal having the pedal body in common and the first and second foot bearing portions different in shape, size, or with an interval therebetween.

Furthermore, the first and second foot bearing portions, which each have an area sufficient in size to contact with the heads of the phalanges, may be level at the upper surface with the pedal body, but they preferably project upwardly from the upper surface thereof and to provide looped grooves as an anti-skid means at the upper surface of each foot bearing portion.

These and other objects of the invention will become more apparent from the following detailed description of an example taken in accordance with the accompanying drawings.

BRIEF DESCRIPTION OF THE DRAWINGS

FIG. 2 is a partially omitted sectional view taken on the line II—II in FIG. 1, FIG. 3 is a sectional view taken on the line III—III in FIG. 1, and FIG. 4 is a sectional plan view of a foot bearing member only, which is used in the FIG. 1 embodiment.

DETAILED DESCRIPTION OF THE INVENTION

Figure 1:
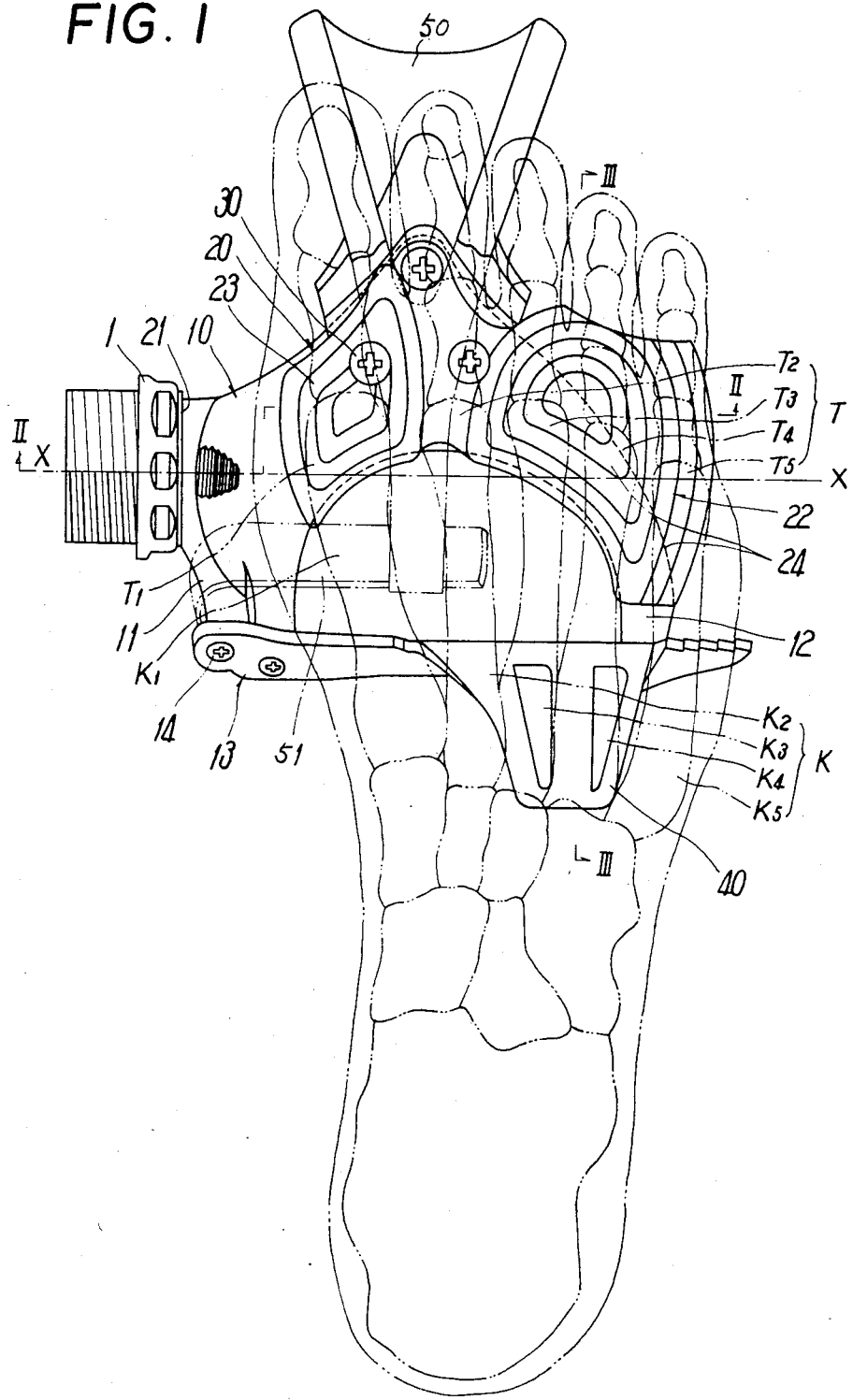
FIG. 1 is a partially cutaway plan view of an embodiment of a pedal of the invention.

Referring to the drawing, a right-hand pedal is shown, in which a pedal body 10 is formed of an aluminum alloy in a block-like shape by die casting and a foot bearing member 20 separate from the pedal body 10 is plate-like shaped by die casting, the pedal body 10 being combined with the foot bearing member 20.

The pedal body 10, as shown in FIG. 1, projects forwardly at a laterally intermediate portion to form an inverted-V-like shaped and extends rearwardly at both lateral sides to form extensions 11 and 12, so that a rear side plate 13 separate from the body 10 is fixed to the extensions 11 and 12 by use of screws or the like. A tubular member 16 having a threaded inner periphery is provided at the lateral side (the left side in the drawing) of pedal body 10 and screws with the pedal shaft 17 as shown in FIG. 2.

In FIG. 2, reference numeral 18 designates a bearing cylinder supported rotatably to the outer peripheries of tubular member 16 and pedal shaft 17 through pairs of balls 19. The bearing cylinder 18 is provided at the outer periphery with a screw thread 18a and screws therethrough with a crank arm (not shown), thus supporting the pedal body 10 rotatably to the crank arm.

The foot bearing member 20 is fixed on the upper surface of pedal body 10 through fixing means, such as screws, and is provided with a first foot bearing portion 21 to contact with the head portion $T_1$ of a first phalange $K_1$ at a cyclist's foot and a second foot bearing portion 22 to contact with at least the head $T_5$ of a fifth phalange $K_5$ among the second to fifth phalanges $K_2$ to $K_5$, so that, when the head portion $T_1$ contacts with the first foot bearing portion 21, at least the head portion $T_5$ of fifth phalange $K_5$ is brought into contact with the second foot bearing portion 22. In addition, the second foot bearing portion 22, as shown in FIG. 1, is sized sufficiently to contact mainly with the head portions $T_3$ to $T_5$ of third to fifth phalanges $K_3$ to $K_5$. As shown in FIG. 1, the first and second foot bearing portions 21,22 are arranged axially outwardly of the pedal shaft 17, and foot bearing portion 21 is located at a side of the pedal body 10 closest to pedal shaft 17.

Alternatively, the first and second foot bearing portions 21 and 22 may be sized sufficiently to contact with the head portions $T_2$ to $T_5$ of the second to fifth phalanges $K_2$ to $K_5$, or only to contact with the head portion $T_5$ of fifth phalange $K_5$, and also may be provided directly on the upper surface of the body 10.

The first and second foot bearing portions 21 and 22 are wide enough to bear the head of each metatarsal bone at the cyclist's foot and are higher at the upper surfaces than the body 10. A plurality of grooves 23 and 24 are provided at the upper surfaces of the foot bearing portions 21 and 22 and extend, for example, longitudinally and bilaterally of the body 10, so that the edges of grooves 23 and 24 serve to prevent the cyclist's foot from skidding. In addition, the grooves 23 and 24, when looped longitudinally and bilaterally, are more effective to prevent skidding in every direction.

Furthermore, the first and second foot bearing portions 21 and 22 are disposed in the vicinity of the axis X—X of pedal shaft 17 and the greater part of each foot bearing portion 21 or 22 is positioned at the front side of the axis X—X and the rest at the rear side of the same.

Incidentally, the embodiment of the invention shown in the drawing, has an auxiliary foot bearing surface 40 extending rearwardly from the rear side plate 13. The auxiliary foot bearing surface 40, when the head portions of the metatarsi tread the first and second foot bearing portions 21 and 22 respectively, bears the third to fifth metatersi at the portions thereof at the tarsal bones side, thereby transmitting a further larger treading force of the auxiliary foot bearing surface 40.

In addition, in the drawings, reference numeral 50 designates a toe clip supported in front of a laterally intermediate portion of the pedal body 10, and 51 designates a toe strap provided across the rear extensions 11 and 22, the toe clip 50 being supported at the root longitudinally movably to the pedal body 10, sandwiched between the pedal body 10 and the foot bearing member 20, and connected at the end with an intermediate portion of strap 51 by use of the fixing means 30.

As seen from the above, when the head portion $T_1$ of the first metatarsus $K_1$ is brought into contact with the first foot bearing portion 21, at least the head portion $T_5$ of the fifth metatarsus $K_5$ is brought into contact with the second foot bearing portion 22. In this condition, the cyclist treads the pedal body 10 to drive the bicycle, in which the first foot bearing portion 21 in contact with the head portion $T_1$ of the first metatarsus $K_1$ transmits the largest treading force and also the second bearing portion 22 in contact with the head portion $T_5$ of the fifth metatarsus $K_5$ maintains the well balanced pedalling operation, whereby he can perform a smooth pedalling operation and effectively transmit the treading force to the pedal body in a fatigueless manner.

In brief, the pedal of the invention is provided with the first and second foot bearing portions 21 and 22 as above-mentioned, so that the treading force is transmitted to the pedal body 10 from the head portions of the first and at least the fifth metatarsi, whereby the cyclist can improve the efficiency of transmitting the treading force, and perform well balanced, smooth, and fatigueless pedalling operation with an increased treading force.

Although a preferred embodiment has been described, it is merely exemplary of the invention and not to be constructed as limiting, the invention being defined solely by the appended claims.

What is claimed is:

1. A pedal for a bicycle comprising a pedal body having a pedal shaft and upper and lower surfaces, said pedal shaft including a base portion adjacent one side of said pedal body, a first and second foot bearing portion provided at said upper surface and in the vicinity of an axis of said pedal shaft, and a rear side plate at a rear portion of said pedal body, said first and second foot bearing portions being arranged axially outwardly of said pedal shaft, said first and second foot bearing portions projecting outwardly of said pedal body and being separated in the axial direction of said pedal shaft, said first and second foot bearing portions having foot bearing surfaces projecting upwardly with respect to said pedal body, said foot bearing surfaces having a length and width defining a foot receiving area, the foot bearing surface of said first foot bearing portion being located at said one side of said pedal body and the foot bearing surface of said second foot bearing portion being displaced outwardly of said first foot bearing portion with respect to said base portion, the foot bearing surface of said second foot bearing portion being displaced rearwardly of said pedal body with respect to the foot bearing surface of said first foot bearing portion, said rear side plate and first and second foot bearing portions being arranged non-symmetrically with respect to the axis of the pedal shaft with said first and second foot bearing portions being closer to the axis of said pedal shaft than said rear side plate.

2. A pedal for a bicycle according to claim 1, wherein said pedal body includes a foot bearing member separate from said body, said foot bearing member having said first and second foot bearing portions.

3. A pedal for a bicycle according to claims 1 or 2, wherein said first and second foot bearing portions have at the upper surfaces thereof a plurality of grooves respectively.

4. A pedal for a bicycle according to claim 3, wherein said grooves, which are disposed at the upper surfaces of said first and second foot bearing portions, comprise longitudinally and bilaterally extending portions and are loop-like shaped.

* * * * *